US008794529B2

(12) United States Patent
Osborne et al.

(10) Patent No.: US 8,794,529 B2
(45) Date of Patent: Aug. 5, 2014

(54) METHOD AND APPARATUS FOR COMMUNICATING INFORMATION VIA A DISPLAY SCREEN USING LIGHT-SIMULATED BAR CODES

(71) Applicant: Mobeam Inc., San Francisco, CA (US)

(72) Inventors: John Osborne, Incline Village, NV (US); David W Russell, Winter Garden, FL (US)

(73) Assignee: Mobeam, Inc., Palo Alto, CA (US)

( * ) Notice: Subject to any disclaimer, the term of this patent is extended or adjusted under 35 U.S.C. 154(b) by 0 days.

(21) Appl. No.: 13/837,673

(22) Filed: Mar. 15, 2013

(65) Prior Publication Data
US 2013/0256422 A1      Oct. 3, 2013

Related U.S. Application Data

(60) Provisional application No. 61/619,333, filed on Apr. 2, 2012.

(51) Int. Cl.
*G06K 19/00* (2006.01)

(52) U.S. Cl.
USPC ................ 235/487; 235/494; 235/462.01

(58) Field of Classification Search
USPC .................... 235/487, 494, 462.01
See application file for complete search history.

(56) References Cited

U.S. PATENT DOCUMENTS

| 5,760,383 | A * | 6/1998 | Heske, III ............ 235/462.16 |
| 6,685,093 | B2 * | 2/2004 | Challa et al. ........... 235/462.46 |
| 6,736,322 | B2 | 5/2004 | Gobburu et al. |
| 6,877,665 | B2 | 4/2005 | Challa et al. |
| 7,028,906 | B2 | 4/2006 | Challa et al. |
| 7,104,452 | B2 * | 9/2006 | Trifilo ................. 235/462.01 |
| 7,395,961 | B2 | 7/2008 | Challa et al. |
| 7,857,225 | B2 | 12/2010 | Challa et al. |
| 7,967,211 | B2 | 6/2011 | Challa et al. |
| 8,172,142 | B2 | 5/2012 | Gobburu et al. |
| 2002/0074404 | A1 * | 6/2002 | Drumm ................ 235/462.01 |
| 2008/0035734 | A1 | 2/2008 | Challa et al. |
| 2011/0215162 | A1 | 9/2011 | Challa et al. |
| 2012/0187184 | A1 | 7/2012 | Challa et al. |

FOREIGN PATENT DOCUMENTS

| WO | 0003328 A1 | 1/2000 |
| WO | 2012012468 A1 | 1/2012 |

OTHER PUBLICATIONS

International Searching Authority/EPO. International Search Report, International Application No. PCT/US2013/034851, Jun. 25, 2013. 3 pages.
Nternational Searching Authority/EPO. Written Opinion of the International Searching Authority, International Application No, PCT/US2013/034851, Jun. 25, 2013. 6 pages.
Osborne, John et al. Method and Apparatus for Communicating Information Via a Display Screen Using Light-Simulated Bar Codes, U.S. Appl. No. 61/619,333, filed Apr. 2, 2012. 152 pages.

* cited by examiner

*Primary Examiner* — Christle I Marshall
(74) *Attorney, Agent, or Firm* — Westberg Law Offices

(57) ABSTRACT

Various types of light source, including those in use in pixel based display devices, may be used for light-simulated bar codes. Liquid crystal displays ("LCD") which utilize a backlight for screen brightness may, for example, be very effective for producing light-simulated bar codes because the entire backlight may be modulated to provide the desired light/dark sequence. Even displays which have no backlight, for example but not limited to OLED and LED displays, may be used for light-simulated bar codes. While the entire display may be used, single pixels or pixel groups of the displays of such displays may be used.

8 Claims, 3 Drawing Sheets

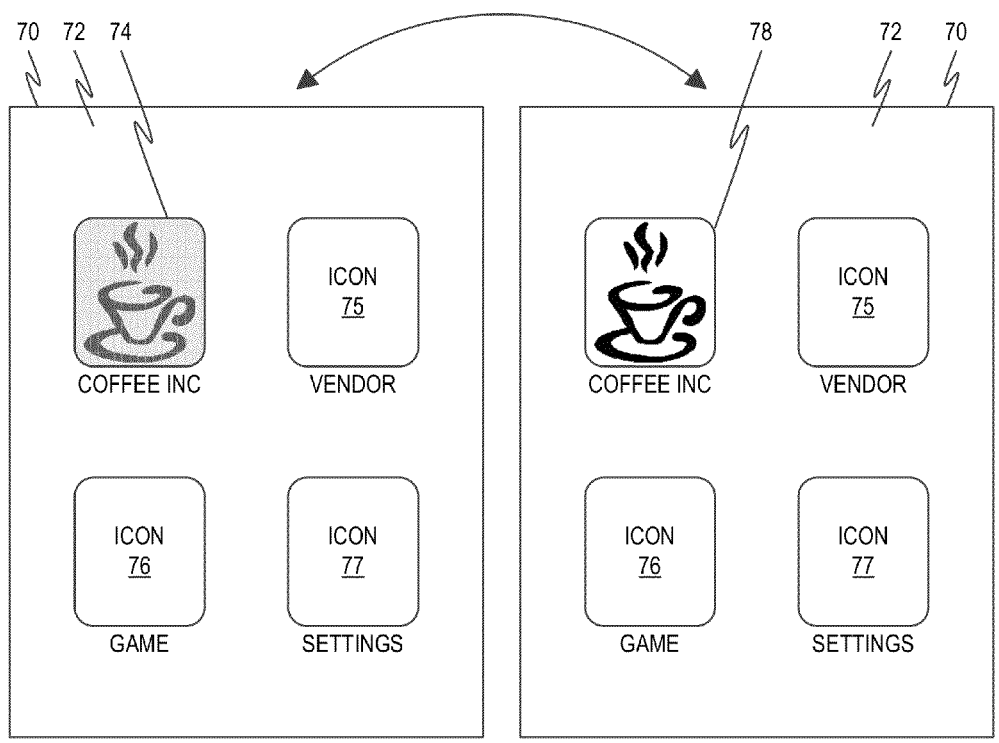

METHOD AND APPARATUS FOR COMMUNICATING INFORMATION VIA A DISPLAY SCREEN USING LIGHT-SIMULATED BAR CODES

CROSS-REFERENCE TO RELATED APPLICATIONS

This application claims the benefit of U.S. Provisional Patent Application Ser. No. 61/619,333 filed Apr. 2, 2012, which hereby is incorporated herein in its entirety by reference thereto.

BACKGROUND OF THE INVENTION

1. Field of the Invention

This invention relates generally to communicating information with a digital device which has a display screen, and more particularly to methods and apparatus for communicating information via the display screen of a digital device using light-simulated bar code technology.

2. Description of the Related Art

The use of bar code scanners in a great many aspects of everyday life is commonplace. While typically printed on paper labels and stubs, bar codes have also been presented statically on the electronic displays of mobile communications devices; see, for example, International Publication No. WO 00/03328 Published Jan. 20, 2000 in the name of applicant Motorola Inc. However, reading static bar codes from displays has been problematical. A technology that simulates a bar code using light and thereby overcomes various limitations of static screen-displayed bar codes is disclosed in, for example, U.S. Pat. No. 6,685,093 issued Feb. 3, 2004 to Challa et al.

SUMMARY OF THE INVENTION

One embodiment of the present invention is a processor-implemented method of operating a digital device having an image display screen to communicate a light-simulated bar code, comprising: selecting an area of pixels within the image display screen, the area comprising pixels arranged in rows, columns, a rectangle, a border, a frame, a circle, a random distribution, a periodic distribution, or any combination of the foregoing; and modulating the pixels in the area to communicate the light-simulated barcode.

Another embodiment of the present invention is a graphical user interface on an image display screen of a digital device, comprising: an area of pixels within the image display screen, the area comprising pixels arranged in rows, columns, a rectangle, a border, a frame, a circle, a random distribution, a periodic distribution, or any combination of the foregoing; wherein the area is modulated to communicate a light-simulated barcode.

Another embodiment of the present invention is a digital device comprising: an image display screen; a processor; a memory; and one or more programs stored in the memory and configured to be executed by the processor, the one or more programs including: processor-executable instructions for selecting an area of pixels within the image display screen, the area comprising pixels arranged in rows, columns, a rectangle, a border, a frame, a circle, a random distribution, a periodic distribution, or any combination of the foregoing; and processor-executable instructions for modulating the area to communicate a light-simulated barcode.

Another embodiment of the present invention is a non-transitory computer-readable storage medium storing instructions executable by a processor to perform a method for operating a digital device having an image display screen to communicate a light-simulated bar code, comprising: instructions for selecting an area of pixels within the image display screen, the area comprising pixels arranged in rows, columns, a rectangle, a border, a frame, a circle, a random distribution, a periodic distribution, or any combination of the foregoing; and instructions for modulating the area to communicate the light-simulated barcode.

Another embodiment of the present invention is a non-transitory computer-readable storage medium storing one or more programs, the one or more programs comprising instructions which when executed by an digital device with an image display screen, causes the digital device to: select an area of pixels within the image display screen, the area comprising pixels arranged in rows, columns, a rectangle, a border, a frame, a circle, a random distribution, a periodic distribution, or any combination of the foregoing; and modulate the area to communicate the light-simulated barcode.

BRIEF DESCRIPTION OF THE SEVERAL VIEWS OF THE DRAWINGS

FIGS. 7 and 8 are screen images showing use of an icon on a display screen for transmitting light-simulated bar codes.

DETAILED DESCRIPTION OF THE INVENTION, INCLUDING THE BEST MODE

Figures 1, 2:
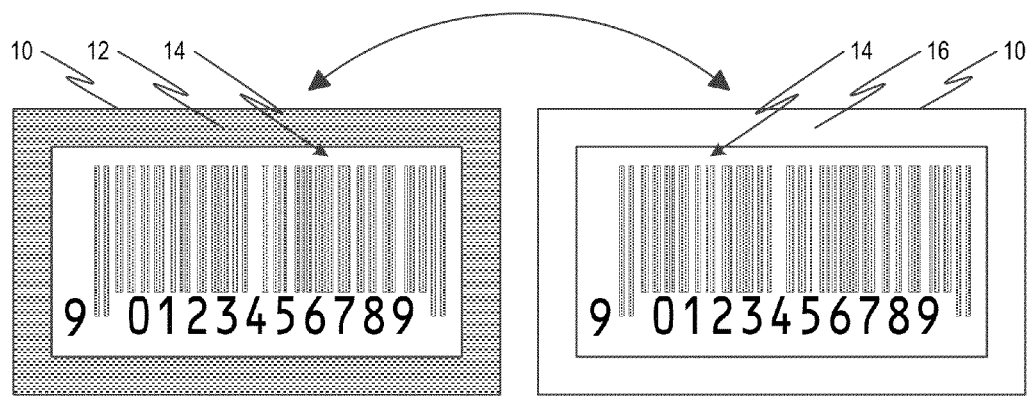
FIGS. 1 and 2 are screen images showing use of a region of a display screen for transmitting light-simulated bar codes.

The technique for communicating information to a bar code scanner with variations in light that simulate a reflection of a scanning beam being moved across a static visual image of the bar code may be referred to as "light-simulated bar code.," The light-simulated bar code technology as well as the various types of digital devices suitable for using light-simulated bar codes are described in, for example, U.S. Pat. No. 6,877,665 issued Apr. 12, 2005 to Challa et al., U.S. Pat. No. 6,685,093 issued Feb. 3, 2004 to Challa et al., U.S. Pat. No. 6,736,322 issued May 18, 2004 to Gobburu et al., U.S. Pat. No. 7,028,906 issued Apr. 18, 2006 to Challa et al., U.S. Pat. No. 7,395,961 issued Jul. 8, 2008 to Challa et al., U.S. Pat. No. 7,857,225 issued Dec. 28, 2010 to Challa et al., and U.S. Pat. No. 7,967,211 issued Jun. 28, 2011 to Challa et al., all of which hereby are incorporated herein in their entirety by reference thereto. The light may be varied in any desired way, including by varying brightness or by turning the light output on and off, by varying color, or in other ways. The term "light" is a broad term as used herein, and includes infrared light as well as visible light.

Various types of light source, including those in use in pixel based display devices, may be used for light-simulated bar codes. Liquid crystal displays ("LCD") which utilize a backlight for screen brightness may, for example, be very effective for producing light-simulated bar codes because the entire backlight may be modulated to provide the desired light/dark sequence. Even displays which have no backlight, for example but not limited to OLED and LED displays, may be used for light-simulated bar codes. While the entire display may be used, single pixels or pixel groups of the displays of such displays may be used.

FIGS. 1-8 show various images as they may be displayed by an image display screen such as but not limited to an LCD, OLED, LED, electroluminescent, or plasma screen capable of creating light and dark pixels or otherwise selectable areas. The display of the image may be controlled by an application, by an operating system, or cooperatively by both. The light and dark pixels may comprise a single pixel, rows, columns, or complex geometries such as but not limited to rectangles, borders, circles, all pixels, a random distribution of pixels, any subset of pixels, or every other pixel or illuminated area or other periodic distribution of pixels.

The modulation of the pixels may be done in any desired manner that may be detected by the bar code scanner. An effective modulation technique is to turn the pixels on and off, from full luminance to zero luminance. Alternatively, the luminance of the pixels may be varied between low and high luminance. Another suitable modulation technique is color modulation, where the color within a group of pixels is varied between a color to which the bar code scanner is sensitive and a color to which the bar code scanner is not sensitive, illustratively red and green. The various modulation techniques may be combined if desired; for example, a color to which the bar code scanner is not sensitive may be displayed at low luminance, while a color to which the bar code scanner is sensitive may be displayed at high or full luminance.

Various geometries and density of the pixels within the geometries may be used as desired, provided that relative to the background luminance of the display screen, the variation in luminance of the modulated geometry on the screen is sufficient to be sensed by the bar code scanner. FIGS. 1 and 2, for example, show a landscape-oriented screen 10 on which a barcode 14 is displayed for human perception. The barcode 14 includes a sequence of white and black lines (the black lines are represented by a field of dense dots). However, due to the limitations of screen 10, the barcode 14 may not be readable by the bar code scanner. A light-simulated bar code may be transmitted from a border or frame-like region around the bar code 14, which may be modulated between a condition 12 which is poorly read by the bar code scanner, and a condition 16 which is well read by the bar code scanner. If the screen 10 is of such a type which would permit the barcode 14 to be readable by a bar code scanner, even if only partially, the barcode 14 may be displayed in a manner less likely to be read by the bar code scanner using such techniques as, for example, dimming, made more gray scale, displayed in a color or colors not within the sensitivity of the bar code reader, or made smaller such that the variance of the modulated region (condition 12 and condition 16) is more significant.

Figures 3, 4:
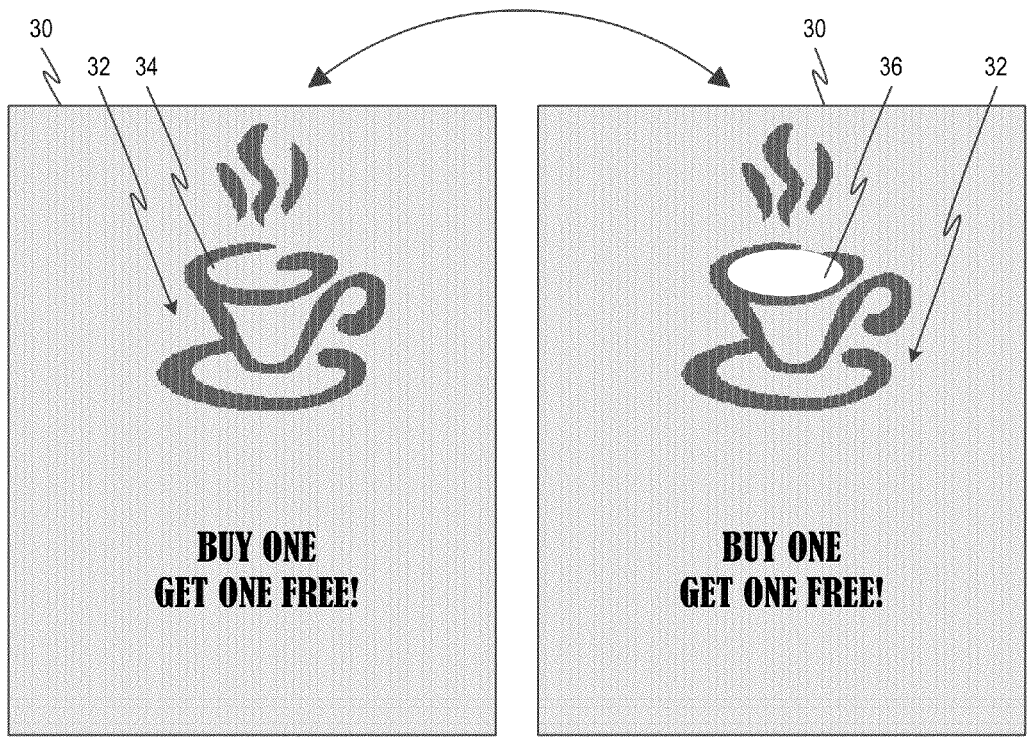
FIGS. 3 and 4 are screen images showing use of a screen region integrated with an image for transmitting light-simulated bar codes.

FIGS. 3 and 4, for example, show a portrait-oriented screen 30 on which an image 32 of interest is displayed for human perception, illustratively a "buy one get one free" coupon for a cup of coffee. Illustratively, the image is static, although it may, if desired, be animated at a frequency outside of the frequency range used by the light-simulated bar code technology. Illustratively, the steam rising from the coffee cup may be animated. A light-simulated bar code may be transmitted from an oval region which is seamlessly integrated with the open top of the coffee cup, which may be modulated between a condition 34 which is poorly read by the bar code scanner, and a condition 36 which is well read by the bar code scanner.

Figures 5, 6:
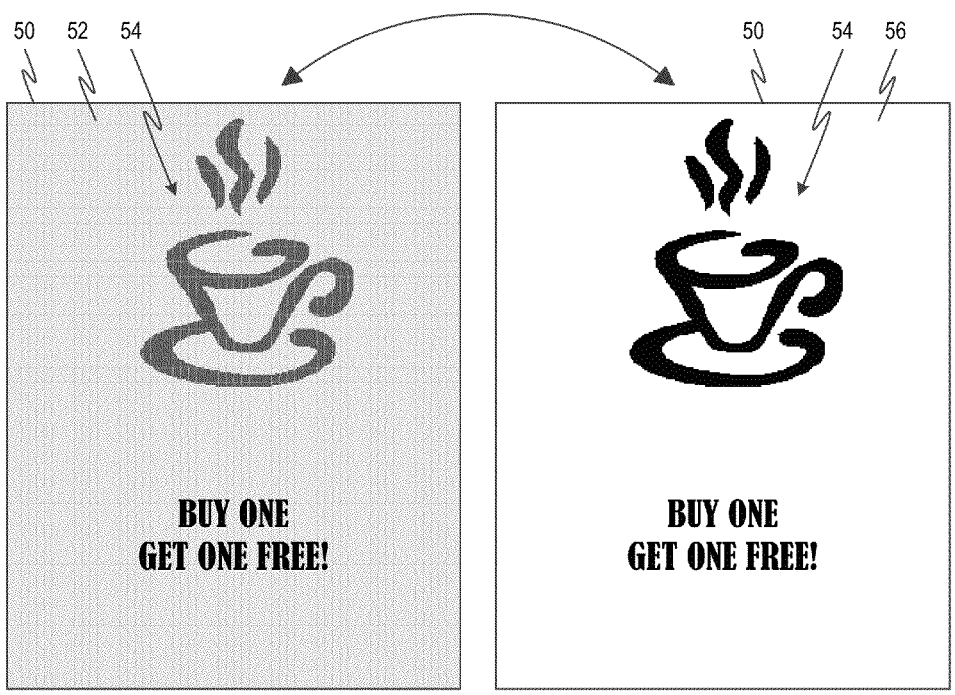
FIGS. 5 and 6 are screen images showing use of the background field of a of a display screen for transmitting light-simulated bar codes.

FIGS. 5 and 6, for example, show a portrait-oriented screen 50 on which an image 54 of interest is displayed for human perception, illustratively a "buy one get one free" coupon for a cup of coffee. Illustratively, the image is static, although it may, if desired, be animated at a frequency outside of the frequency range used by the light-simulated bar code technology. Illustratively, the steam rising from the coffee cup may be animated. A light-simulated bar code may be transmitted from the entire field of pixels of the screen 50 other than pixels used for the image 54, which may be modulated between a condition 52 which is poorly read by the bar code scanner, and a condition 56 which is well read by the bar code scanner. All of the pixels may be used, or a lesser density of pixels may be used, as desired.

The frequency spread of the modulation may vary depending on the bar code information and the type of scanner or scanners with which the digital device is intended for use.

FIGS. 7 and 8 show a portrait-oriented screen 70 on which a number of icons such as 74, 75, 76 and 77 are displayed over a field 72. Illustratively, the icons 75, 76 and 77 are static, although they may, if desired, be animated at a frequency outside of the frequency range used by the light-simulated bar code technology. Various operating systems such as, for example, the Android operating system available from Google Inc. of Mountain View, Calif., which runs on a variety of smartphone and tablet platforms, and the iOS operating system available from Apple Computer of Cupertino, Calif., which runs on such platforms as the IPHONE® mobile digital device and the IPAD® mobile digital device, provide for multiple pages of icons. As groups of pixels, individual icons may be modulated in accordance with the light-simulated bar code technology. A light-simulated bar code may be transmitted from the icon corresponding to the application of interest, which may be modulated between a condition 74 which is poorly read by the bar code scanner, and a condition 78 which is well read by the bar code scanner. The Coffee Inc. icon 74, for example, may be modulated to send a "buy one get one free" coupon, which can be scanned at the coffee shop simply by displaying the page of icons on the user's digital device, without the need to open the application. The application may be opened prior to the visit to select the coupon or other information desired to modulate the icon corresponding to the application. To improve scanner performance, the field 72 and the other icons, illustratively 75, 76 and 77, may be of a suitable color and luminance so as to be poorly read by the bar code scanner, and thereby avoid interfering with the bar code scanner.

Multiple applications may communicate through their icons using light-simulated bar codes, in which case their individual icons may be modulated sequentially. Alternatively, the field 72 or other region or regions of the display screen 70 may be modulated sequentially in accordance with the light-simulated bar codes for the multiple applications.

Although the display of the icons is under control of the operating system, many operating systems including the Android operating system and the iOS operating system support messaging between the applications and their display icons, which can then be modified to reflect the status of the application. Such messaging may be used to control modulation of the icon. Moreover, some operating systems such as the Android operating system include an area of the screen for displaying notification icons, which are under application program control.

The ability to modulate one or more icons in a field of icons has many uses. For example, when a page of icons is displayed, each one can be stimulated in turn, leaving it up to the barcode scanner to recognize the coupon(s) in is database. As with an application's display, the same icon may be used to present more than one digital transaction document such as, for example, a number of coupons while at a supermarket. The ability to queue up a number of coupons, even as many as twenty or fifty or more, for serial presentation at a point-of-sale or a point-of-service may shorten wait-in-line time in many cases.

Such digital transaction documents may be acquired in any desired manner, including manual and automatic techniques. In one automatic technique wherein the digital transaction document is a coupon, the customer may scan an item being purchased or considered for purchase, whereupon the application may access the Cloud to find and download the best coupon available, and even suggest a similar product that has a better coupon (or that has a coupon when the product being purchased or considered for purchase does not), then store that in the queue for presentation at the checkout.

Digital devices suitable for light-simulated bar codes vary may include a processor and a computer-readable medium in any suitable combination of hardware, firmware and software. Examples of processors include microprocessors, controllers and logic circuits, and a processor may be implemented as a multi-core unit or by multiple processor units. Examples of computer readable media, which may be realized in a single type of read-only memory or readable-writable memory or which may include combinations of different types of memory, include static random access memory ("SRAM"), dynamic random access memory ("DRAM"), FLASH memory, solid-state memory, magnetic memory, optical memory, compact disk read-only memory, and so forth. Data and programs containing processor-executable instructions for operating the mobile personal digital device and implementing various applications may be stored in the computer-readable medium and executed by the processor.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. Unless otherwise explicitly stated, any specific values given herein are illustrative, and may be varied as desired. Where various timings are set forth, these timings may not be exact unless otherwise explicitly stated, but rather may vary depending on circuit layout, signal line impedance, and other practical design factors as are well known in the art. A reference to individual values indicative of a range is inclusive of all values within the range. These and other variations and modifications of the embodiments disclosed herein, including of the alternatives and equivalents of the various elements of the embodiments, may be made without departing from the scope of the invention.

The invention claimed is:

1. A processor-implemented method of operating a digital device having an image display screen to communicate a light-simulated bar code, comprising:
   selecting a first area of pixels within the image display screen, the first area comprising pixels arranged in rows, columns, a rectangle, a border, a frame, a circle, a random distribution, a periodic distribution, or any combination of the foregoing;
   modulating the pixels in the first area to communicate the light-simulated barcode;
   selecting a second area of pixels within the image display screen; and
   animating an image displayed within the second area at a frequency outside a frequency range used to communicate the light simulated bar code and wherein the first area and the second area comprise integrated portions of a human-perceptible displayed image.

2. The processor-implemented method of claim 1 wherein the modulating step comprises modulating the pixels in the area by turning the pixels on and off to communicate the light-simulated barcode.

3. The processor-implemented method of claim 1 wherein the modulating step comprises modulating the pixels in the area by varying intensity of the pixels to communicate the light-simulated barcode.

4. The processor-implemented method of claim 1 wherein the modulating step comprises modulating the pixels in the area by changing color of the pixels to communicate the light-simulated barcode.

5. The processor-implemented method of claim 1 wherein the selecting and modulating step are under control of an operating system running on the digital device.

6. The processor-implemented method of claim 1 wherein the selecting and modulating step are under control of an application program running on the digital device.

7. A graphical user interface on an image display screen of a digital device, comprising:
   a first area of pixels within the image display screen, the first area comprising pixels arranged in rows, columns, a rectangle, a border, a frame, a circle, a random distribution, a periodic distribution, or any combination of the foregoing; and
   a second area of pixels within the image display screen, wherein the first area is modulated to communicate a light-simulated barcode and wherein an image displayed within the second area is animated at a frequency outside a frequency range used to communicate the light simulated bar code and wherein the first area and the second area comprise integrated portions of a human-perceptible displayed image.

8. A digital device comprising:
   an image display screen;
   a processor;
   a memory; and
   one or more programs stored in the memory and configured to be executed by the processor, the one or more programs including:
   processor-executable instructions for selecting a first area of pixels within the image display screen, the first area comprising pixels arranged in rows, columns, a rectangle, a border, a frame, a circle, a random distribution, a periodic distribution, or any combination of the foregoing;
   processor-executable instructions for modulating the first area to communicate a light-simulated barcode; and
   processor-executable instructions for animating an image displayed within a second area at a frequency outside a frequency range used to communicate the light simulated bar code and wherein the first area and the second area comprise integrated portions of a human-perceptible displayed image.

* * * * *